United States Patent
Zhao et al.

(10) Patent No.: US 11,032,836 B2
(45) Date of Patent: Jun. 8, 2021

(54) METHOD AND DEVICE FOR BWP ALLOCATION

(71) Applicant: China Academy of Telecommunications Technology, Beijing (CN)

(72) Inventors: Li Zhao, Beijing (CN); Ying Peng, Beijing (CN); Rui Zhao, Beijing (CN); Qiong Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 17/044,324

(22) PCT Filed: Apr. 12, 2019

(86) PCT No.: PCT/CN2019/082579
§ 371 (c)(1),
(2) Date: Sep. 30, 2020

(87) PCT Pub. No.: WO2019/196952
PCT Pub. Date: Oct. 17, 2019

(65) Prior Publication Data
US 2021/0051688 A1 Feb. 18, 2021

(30) Foreign Application Priority Data

Apr. 13, 2018 (CN) .......................... 201810333176.7

(51) Int. Cl.
*H04W 72/04* (2009.01)
*H04W 72/12* (2009.01)
(Continued)

(52) U.S. Cl.
CPC ..... *H04W 72/1263* (2013.01); *H04L 27/2607* (2013.01); *H04W 4/40* (2018.02); *H04W 72/0453* (2013.01)

(58) Field of Classification Search
CPC .............. H04W 72/1263; H04W 4/40; H04W 72/0453; H04L 27/2607
See application file for complete search history.

(56) References Cited

U.S. PATENT DOCUMENTS

2017/0126300 A1  5/2017 Park et al.
2018/0288746 A1* 10/2018 Zhang ................... H04L 1/0031

FOREIGN PATENT DOCUMENTS

CN   103297980 A   9/2013
WO   2013127310 A1  9/2013

OTHER PUBLICATIONS

RAN WG4, "LS on Mixed numerologies FDM operation", 3GPP TSG RAN WG1 Meeting AH_NR#3, Nagoya, Japan, Sep. 18-21, 2017, total 2 pages,R1-1715367.
(Continued)

*Primary Examiner* — Asad M Nawaz
*Assistant Examiner* — Zhaohui Yang
(74) *Attorney, Agent, or Firm* — Kilpatrick Townsend & Stockton, LLP (57) ABSTRACT

A method and device for BWP allocation are discloses. First, difference information between a first node and a second node is determined; then, whether an allocation condition is satisfied is determined according to the difference information and the reliability requirement of a service corresponding to a BWP needing to be allocated to the first node, and if the allocation condition is satisfied, the BWP is allocated to the first node in a time unit corresponding to the second node; and at this time, the second node can resist trailing signal interference by means of a coding gain, etc.

15 Claims, 3 Drawing Sheets

(51) Int. Cl.
    *H04W 4/40*      (2018.01)
    *H04L 27/26*     (2006.01)

(56)           References Cited

OTHER PUBLICATIONS

RAN WG1, "LS response on spectrum utilization", 3GPP TSG-RAN WG3#97BIS, Prague, Czech Republic, Oct. 9-13, 2017, total 2 pages, R3-173580.

\* cited by examiner

METHOD AND DEVICE FOR BWP ALLOCATION

This application is a national phase entry under 35 U.S.C. § 371 of International Application No. PCT/CN2019/082579, filed on Apr. 12, 2019, which claims priority of Chinese Patent Application No. 201810333176.7, filed with the China National Intellectual Property Administration (CNIPA) on Apr. 13, 2018 and entitled "Method and Device for BWP allocation", the entire content of which is incorporated herein by reference.

FIELD

The present disclosure relates to the field of wireless communication technologies, and particularly to a method and device for BWP (Bandwidth Part) allocation.

BACKGROUND

At present, in the existing 5G New Radio (NR) technology, a User Equipment (UE, also called terminal) is not mandatory to support the use of different parameter sets in the same time unit and support Frequency Division Multiplex (FDM) physical channels that simultaneously perform downlink reception or uplink transmission. In the Vehicle to x(V2X) communication, when meeting the requirements of higher node density and business volume in the V2X system, there is also a need to meet the requirement of low-latency transmission of V2X services, so the data transmission in the FDM mode needs to be taken into consideration.

Different parameter sets are used for data transmission in the FDM mode. In the existing Long Term Evolution (LTE), when the data transmission is performed in the FDM mode, since the sub-carrier spacing is fixed at 15 kHz, there will be no performance degradation among different frequency domain resources of the FDM due to the tailing signal interference of sub-carriers when the effect of the frequency offset is not considered in the same subframe.

The parameter set (Numerology) defined in the existing 5G NR includes adjustable Sub-Carrier Spacing (SCS), adjustable Cyclic Prefix (CP), etc.

SCS configurations and different CP configurations are defined in the 5G NR. When the CP configurations are all the common configurations and the SCS configurations are different, the mutual interference will be caused among different frequency domain resources of the FDM because the tailing signals are not orthogonal to each other.

In summary, in the prior art, when the V2X communication is performed in the FDM mode under the 5G NR, the tailing signal interference of sub-carriers exists, causing the performance degradation.

BRIEF SUMMARY

Embodiments of the present application provide a method and device for BWP allocation, to solve the problem of performance degradation due to the tailing signal interference of sub-carriers existing when the V2X communication is performed in the FDM mode under the 5G NR in the prior art.

In a first aspect, embodiments of the present application provide a method for BWP allocation, which includes:

determining BWP difference information corresponding to different parameter sets of a first node to which a BWP needs to be allocated and a second node to which a BWP has been allocated according to a first mapping relationship between different parameter sets and BWP difference information, and BWP allocation needs to be performed for the first node in a time unit corresponding to the second node;

judging whether an allocation condition is satisfied according to the determined BWP difference information and a reliability requirement of a service corresponding to the BWP that needs to be allocated to the first node; and allocating a BWP to the first node in the time unit corresponding to the second node when the allocation condition is satisfied.

In the above method, the difference information between the first node and the second node is determined at first, and then it is judged whether the allocation condition is satisfied according to the difference information and the reliability requirement of the service corresponding to the BWP that needs to be allocated to the first node, and the BWP is allocated to the first node in the time unit corresponding to the second node when the allocation condition is satisfied. When the second node can compensate for the interference introduced by the BWP through the coding gain, etc., the BWP is allocated to the first node in the time unit corresponding to the second node. In this way, the signal interference can be avoided when the data transmission is performed in the FDM mode. Further, since the data transmission is performed in the FDM mode, multiple data transmissions can be performed at the same time. The requirements of high node density and business volume of the V2X system are satisfied, while the requirements of low latency and high reliability are ensured, improving the system performance.

In a possible implementation, the allocation condition includes some or all of the following allocation conditions:

a first allocation condition: a difference value between the BWP that needs to be allocated to the first node and the BWP that has been allocated to the second node is less than a maximum difference value, a reliability level of the service corresponding to the BWP that needs to be allocated to the first node is lower than a threshold, and there are resources matching with the BWP that needs to be allocated to the first node in resources that can be allocated in the time unit corresponding to the second node;

a second allocation condition: the difference value between the BWP that needs to be allocated to the first node and the BWP that has been allocated to the second node is not less than the maximum difference value, the reliability level of the service corresponding to the BWP that needs to be allocated to the first node is not lower than the threshold, and there are resources matching with the BWP that needs to be allocated to the first node and resources corresponding to guard interval information in resources that can be allocated in the time unit corresponding to the second node;

and the maximum difference value is a maximum difference value corresponding to coding configuration information of the first node in the BWP difference information; and the resources corresponding to the guard interval information are resources corresponding to the coding configuration information of the first node in guard interval information corresponding to the different parameters sets of the first node and the second node.

In the above method, when the first node satisfies the first allocation condition, it is determined that resource allocation can be performed for the first node in the same time unit as for the second node. Further, since the difference value between the BWP that needs to be allocated to the first node and the BWP that has been allocated to the second node is less than the maximum difference value, when the data transmission is performed in the FDM mode, the interference introduced by the BWP can be compensated by the coding gain and so on, and thus the characteristics of low latency and high reliability of the V2X service can be ensured. Further, since the data transmission is performed in the FDM mode, the characteristics of high node density and high business volume of the V2X service can be satisfied.

When the first node satisfies the second allocation condition, it is determined that resource allocation can be performed for the first node in the same time unit as for the second node to which the BWP has been allocated. Further, since the difference value between the BWP that needs to be allocated to the first node and the BWP that has been allocated to the second node is not less than the maximum difference value, and the reliability level of the service corresponding to the BWP that needs to be allocated to the first node is also relatively high, the guard interval is used to avoid the interference caused by the tailing signal.

In a possible implementation, the guard interval information corresponding to the different parameters sets of the first node and the second node is determined according to a second mapping relationship between different parameter sets and guard interval information.

In the above method, the guard interval information corresponding to the different parameters sets of the first node and the second node is determined according to the parameter set of the first node, the parameter set of the second node, and the second mapping relationship between different parameter sets and guard interval information. In this way, according to the determined guard interval information, it can be further judged whether there are resources matching with the BWP that needs to be allocated to the first node in the resources that can be allocated in the time unit corresponding to the second node that has been allocated, and the data transmission mode is further determined.

In a possible implementation, when the second allocation condition is satisfied, a BWP is allocated to the first node in the time unit corresponding to the second node, and a frequency-domain guard interval is set between the BWP of the first node and the BWP of the second node according to the resources corresponding to the guard interval information.

In the above method, when it is determined that the first node satisfies the second allocation condition, the BWP is allocated to the first node in the time unit corresponding to the second node, and the frequency-domain guard interval is set between the BWP of the first node and the BWP of the second node according to the resources corresponding to the guard interval information. Since the guard interval is set, the interference of the tailing signal can be eliminated, so that the service requirement of high reliability during the V2X service transmission can be ensured. Further, the data transmission is performed in the FDM mode, so the service requirement of low latency during the V2X service transmission can be ensured, improving the performance.

In a possible implementation, after judging whether the allocation condition is satisfied according to the determined BWP difference information and the reliability requirement of the service corresponding to the BWP that needs to be allocated to the first node, the BWP is allocated in the FDM mode in a time unit different from the time unit corresponding to the second node in the Time Division Multiplex (TDM) mode if the allocation condition is not satisfied.

In the above method, when the allocation condition is not satisfied, the BWP is allocated in the FDM mode in the time unit different from the time unit corresponding to the second node in the TDM mode. In this way, when the resources cannot be allocated to the first node in the current time unit of the second node, it is also possible to allocate the BWP in the FDM mode in the time unit different from the time unit corresponding to the second node in the TDM mode.

In a second aspect, embodiments of the present application provides a device for BWP allocation, which includes: a processor, a memory and a transceiver;

and the processor is configured to read a program in the memory and perform:

determining BWP difference information corresponding to different parameter sets of a first node to which a BWP needs to be allocated and a second node to which a BWP has been allocated according to a first mapping relationship between different parameter sets and BWP difference information, and BWP allocation needs to be performed for the first node in a time unit corresponding to the second node;

judging whether an allocation condition is satisfied according to the determined BWP difference information and a reliability requirement of a service corresponding to the BWP that needs to be allocated to the first node; and allocating a BWP to the first node in the time unit corresponding to the second node when the allocation condition is satisfied.

In a possible implementation, the allocation condition includes some or all of the following allocation conditions:

a first allocation condition: a difference value between the BWP that needs to be allocated to the first node and the BWP that has been allocated to the second node is less than a maximum difference value, a reliability level of the service corresponding to the BWP that needs to be allocated to the first node is lower than a threshold, and there are resources matching with the BWP that needs to be allocated to the first node in resources that can be allocated in the time unit corresponding to the second node;

a second allocation condition: the difference value between the BWP that needs to be allocated to the first node and the BWP that has been allocated to the second node is not less than the maximum difference value, the reliability level of the service corresponding to the BWP that needs to be allocated to the first node is not lower than the threshold, and there are resources matching with the BWP that needs to be allocated to the first node and resources corresponding to guard interval information in resources that can be allocated in the time unit corresponding to the second node;

and the maximum difference value is a maximum difference value corresponding to coding configuration information of the first node in the BWP difference information; and the resources corresponding to the guard interval information are resources corresponding to the coding configuration information of the first node in guard interval information corresponding to the different parameters sets of the first node and the second node.

In a possible implementation, the processor is further configured to:

determine the guard interval information corresponding to the different parameters sets of the first node and the second node according to a second mapping relationship between different parameter sets and guard interval information.

In a possible implementation, the processor is further configured to:

when the second allocation condition is satisfied, allocate a BWP to the first node in the time unit corresponding to the second node, and set a frequency-domain guard interval between the BWP of the first node and the BWP of the second node according to the resources corresponding to the guard interval information.

In a possible implementation, the processor is further configured to:

allocate a BWP in an FDM mode in a time unit different from the time unit corresponding to the second node in a TDM mode when the allocation condition is not satisfied after judging whether the allocation condition is satisfied according to the determined BWP difference information and the reliability requirement of the service corresponding to the BWP that needs to be allocated to the first node.

In a third aspect, embodiments of the present application provide a device for BWP allocation, which includes:

a determining device configured to determine BWP difference information corresponding to different parameter sets of a first node to which a BWP needs to be allocated and a second node to which a BWP has been allocated according to a first mapping relationship between different parameter sets and BWP difference information, and BWP allocation needs to be performed for the first node in a time unit corresponding to the second node;

a judgment device configured to judge whether an allocation condition is satisfied according to the determined BWP difference information and a reliability requirement of a service corresponding to the BWP that needs to be allocated to the first node; and an allocation device configured to allocate a BWP to the first node in the time unit corresponding to the second node when the allocation condition is satisfied.

In a fourth aspect, a computer storage medium provided by embodiments of the present application stores a computer program thereon, where the program implements the steps of the above method for BWP allocation when executed by a processor.

Furthermore, the embodiments brought about by any implementation in the second to fourth aspects can refer to the embodiments brought about by different implementations in the first aspect, and will not be repeated here.

BRIEF DESCRIPTION OF THE DRAWINGS

Embodiments of the present application are described in the accompanying figures which are used in describing the embodiments which will be introduced below briefly.

DETAILED DESCRIPTION OF THE EMBODIMENTS

In the following, some terms in the embodiments of the present application are explained to facilitate the understanding of the embodiments.

(1) In the embodiments of the present application, the nouns "network" and "system" are often used alternately.

(2) The term "a plurality of" in the embodiments of the present application refers to two or more, and other quantifiers are similar thereto.

(3) "and/or" describes the association relationships of the associated objects, and indicates that there may be three relationships, for example, A and/or B may represent: only A, both A and B, and only B. The character "/" generally indicates that the associated objects have a kind of "or" relationship.

In order to improve the safety and intelligence of transportation systems, the concept of intelligent transportation system is gradually emerging. The intelligent transportation can use the new generation of communication network and data processing capability to improve the overall efficiency of the existing transportation system, reduce the energy loss, and increase the safety and convenience degree of transportation.

In recent years, the development of the intelligent transportation system will mainly focus on the field of intelligent highway transportation system, which is commonly known as the Internet of vehicles. The V2X technology utilizes the wireless communications between vehicles, vehicles and road side infrastructure, vehicles and passersby to perceive the surrounding conditions of vehicles in real time and warn timely, which has become a research hotspot in various countries in the world to solve the road safety problem. According to the data provided by the US Department of Transportation, the V2X technology can help to prevent 80% of all types of traffic accidents.

The vehicles equipped with the V2X function are equipped with advanced vehicle-carried sensors, controllers, actuators and other devices, and integrate the modern communication and network technologies to realize the exchange and sharing of intelligent information between vehicles and X (persons, vehicles, roads, backgrounds, etc.). These vehicles have the complex functions such as environment perception, intelligent decision, cooperative control and execution, which can realize the safe, comfortable, energy-saving and efficient driving, and can finally replace the persons to operate as a new generation of vehicles.

Thus, in the V2X communication, there will be a large amount of data to be transmitted, and the timely feedback is also required. That is, when the V2X system has the requirements of higher node density and business volume, it also needs to meet the transmission requirements of low latency and high reliability of V2X services, so the data transmission in the FDM mode needs to be taken into consideration.

In the existing 5G NR, the UE is not mandatory to support the use of different parameter sets (Numerology) in the same time unit and support FDM physical channels that perform simultaneously the downlink reception or uplink transmission.

Here, the parameter set defined in the 5G NR includes adjustable SCS, adjustable Cyclic Prefix (CP), etc.

SCS configurations and different CP configurations are defined in the 5G NR. In the embodiments of the present application, the CP configurations are all set as common configurations. The different processing methods brought about by different CP configurations are not considered, and only different processing methods brought about by the adjustable SCS in the parameter set are considered. When the data transmission is performed in the FDM mode and the adjustable SCS configurations in the parameter set are different, the mutual interference will be caused among different frequency domain resources of the FDM because the tailing signals are not orthogonal to each other.

In the prior art, the setting of the guard interval is not considered when eliminating the interference of the tailing signals, the interference caused by the superposition of the tailing signals is resisted only depending on the gain of the reception processing during reception. The generally used gains are: coding gain, reception diversity gain, retransmission merging gain, etc. When different frequency domain resources of the FDM differ greatly in size, the system noise is relatively large, and it is difficult to ensure the highly reliable V2X service depending on the above gains.

On the other hand, when eliminating the interference of the tailing signals, the windowing and filtering can be performed at the sending end. In this method, if the order of window filtering implementation is low, the signal filtering effect is not ideal, and the interference effect will still cause the performance degradation; if the order of window filtering implementation is high, the signal filtering effect is better, but the residual interference effect still remains, and the processing complexity at the sending end will increases significantly.

In one embodiment, the above methods all have limitations and cannot completely eliminate the interference of the tailing signals. Therefore, the embodiments of the present application will provide a method for BWP allocation, so that the data transmission is performed in the FDM mode in the V2X communication, to meet the characteristics of high node density and high traffic volume of the V2X system, and also meet the requirement of low-latency transmission of the V2X service.

Here, the execution subject in the embodiments of the present application may be a network-side device or a first node. The network-side device may be a base station; and the first node and the second node may be mobile devices, such as mobile phones, vehicles in the V2X system, etc.

Embodiments of the present application will be further illustrated below in details with reference to the accompanying figures. Embodiments are merely a part of the present application but not all the embodiments.

Figure 1:
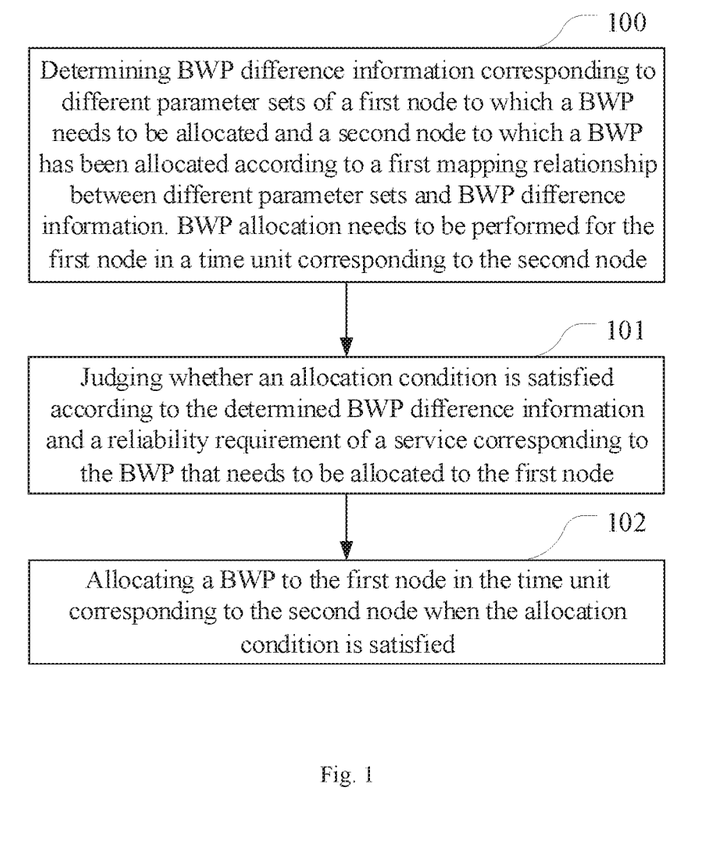
FIG. 1 is a schematic diagram of a flow of a method for BWP allocation provided by an embodiment of the present application.

As shown in FIG. 1, embodiments of the present application provide a method for BWP allocation, which includes:

Step 100: determining BWP difference information corresponding to different parameter sets of a first node to which a BWP needs to be allocated and a second node to which a BWP has been allocated according to a first mapping relationship between different parameter sets and BWP difference information, and BWP allocation needs to be performed for the first node in a time unit corresponding to the second node;

Step 101: judging whether an allocation condition is satisfied according to the determined BWP difference information and a reliability requirement of a service corresponding to the BWP that needs to be allocated to the first node; and Step 102: allocating a BWP to the first node in the time unit corresponding to the second node when the allocation condition is satisfied.

In the embodiments of the present application, the difference information between the first node and the second node is determined at first, and then the maximum difference value between the first node and the second node is determined according to the difference information and the specific coding configuration of the second node, then the specific allocation condition is determined according to the maximum difference value, and the BWP is allocated to the first node in the time unit corresponding to the second node when it is judged and determined that the first node satisfies the allocation condition. When the second node can compensate for the interference introduced by the BWP through the coding gain, etc., the BWP is allocated to the first node in the time unit corresponding to the second node. In this way, the signal interference can be avoided when the data transmission is performed in the FDM mode. Further, since the data transmission is performed in the FDM mode, multiple data transmissions can be performed at the same time. The requirements of high node density and business volume of the V2X system are satisfied, while the requirements of low latency and high reliability are ensured, improving the system performance.

The method for BWP allocation provided by embodiments of the present application will be described in detail below.

In step 100, at first the BWP difference information corresponding to different parameter sets of the first node to which a BWP needs to be allocated and the second node to which a BWP has been allocated is determined according to the first mapping relationship between different parameter sets and BWP difference information. BWP allocation needs to be performed for the first node in a time unit corresponding to the second node.

In a specific implementation, when BWP allocation needs to be performed for the first node to which a BWP needs to be allocated in the time unit corresponding to the second node to which a BWP has been allocated, at first the BWP difference information corresponding to different parameter sets of the first node to which a BWP needs to be allocated and the second node to which a BWP has been allocated is determined according to the parameter set of the first node, the parameter set of the second node, and the first mapping relationship between different parameter sets and BWP difference information. In this way, it can be further determined according to the determined BWP difference information whether BWP allocation can be performed for the first node in the same time unit as for the second node.

Here, the first mapping relationship between different parameter sets and BWP difference information, on which the determining of the BWP difference information corresponding to different parameter sets of the first node to which a BWP needs to be allocated and the second node to which a BWP has been allocated relies, is a mapping relationship of the maximum difference value of the difference in size of BWPs allocated to the first node and the second node in different coding-side configurations among different parameter sets set in a given time unit, and the difference information between the first node and the second node may be determined according to the difference between the first node and the second node as well as the coding configuration of the first node. There are many representation forms of the mapping relationship of the maximum difference value of the difference in size of BWPs between different parameter values set in the given time unit. Table 1 below is a representation form of the first mapping relationship between different parameter sets and BWP difference information.

In Table 1, there are three different parameter sets (namely N1, N2 and N3) in the V2X system, where the first row of Table 1 represents: between the parameter set N1 and the parameter set N2, if the adopted coding configuration is C1, then the maximum difference value of the BWP difference corresponding to the two nodes is 1 MHz; and if the adopted coding configuration is C2, then the maximum difference value of the BWP difference corresponding to the two nodes is 3 MHz.

The second row represents: between the parameter set N1 and the parameter set N3, if the adopted coding configuration is C1, then the maximum difference value of the BWP difference corresponding to the two nodes is 2 MHz; and if the adopted coding configuration is C2, then the maximum difference value of the BWP difference corresponding to the two nodes is 4 MHz.

The third row represents: between the parameter set N2 and the parameter set N3, if the adopted coding configuration is C1, then the maximum difference value of the BWP difference corresponding to the two nodes is 4 MHz; and if the adopted coding configuration is C2, then the maximum difference value of the BWP difference corresponding to the two nodes is 8 MHz.

Thus, in a specific implementation of the embodiments of the present application, after the parameter set of the first node to which a BWP needs to be allocated and the parameter set of the second node to which a BWP has been allocated are determined, the BWP difference information corresponding to different parameter sets of the first node and the second node can be determined.

For example: it is assumed that there are three different parameter sets (namely N1, N2 and N3) and two coding configurations (C1 and C2) in the 5G NR V2X system; and it is assumed that the mapping table of BWP difference in size between different parameter sets is set as shown in Table 1.

TABLE 1 mapping relationship table of BWP difference
in size between different parameter sets

| | | |
|---|---|---|
| N1 – N2 | C1 | 1 MHz |
| | C2 | 2 MHz |
| N1 – N3 | C1 | 2 MHz |
| | C2 | 4 MHz |
| N2 – N3 | C1 | 4 MHz |
| | C2 | 8 MHz |

EXAMPLE 1 it is assumed that the service configuration parameter set of the node A to which a BWP has been allocated is N1, and the service configuration parameter set of the node B to which a BWP needs to be allocated is N2. The resources have been allocated to the node A, and the allocated BWP is BWP(A)=20 MHz in a given time unit.

Then it can be determined that the BWP difference information corresponding to the node A to which a BWP has been allocated and the node B to which a BWP needs to be allocated is the difference information between the parameter set N1 and the parameter set N2, and thus the BWP difference information corresponding to the node A to which a BWP has been allocated and the node B to which a BWP needs to be allocated is determined as:

if the coding configuration adopted by the node B to which a BWP needs to be allocated is C1, the maximum difference value of the BWP difference corresponding to the node A to which a BWP has been allocated and the node B to which a BWP needs to be allocated is 1 MHz;

if the coding configuration adopted by the node B to which a BWP needs to be allocated is C2, the maximum difference value of the BWP difference corresponding to the node A to which a BWP has been allocated and the node B to which a BWP needs to be allocated is 2 MHz.

EXAMPLE 2 referring to Table 1, it is assumed that the service configuration parameter set of the node A to which a BWP has been allocated is N3, and the service configuration parameter set of the node B to which a BWP needs to be allocated is N2. The resources have been allocated to the node A, and the allocated BWP is BWP(A)=20 MHz in a given time unit.

Then it can be determined that the BWP difference information corresponding to the node A to which a BWP has been allocated and the node B to which a BWP needs to be allocated is the difference information between the parameter set N2 and the parameter set N3, and thus the BWP difference information corresponding to the node A to which a BWP has been allocated and the node B to which a BWP needs to be allocated is determined as:

if the coding configuration adopted by the node B to which a BWP needs to be allocated is C1, the maximum difference value of the BWP difference corresponding to the node A to which a BWP has been allocated and the node B to which a BWP needs to be allocated is 4 MHz;

if the coding configuration adopted by the node B to which a BWP needs to be allocated is C2, the maximum difference value of the BWP difference corresponding to the node A to which a BWP has been allocated and the node B to which a BWP needs to be allocated is 8 MHz.

After determining the BWP difference information corresponding to different parameter sets of the first node to which a BWP needs to be allocated and the second node to which a BWP has been allocated, it is necessary to make a further judgment according to the determined BWP difference information and the reliability requirement of the service corresponding to the BWP that needs to be allocated to the first node.

Before the step 102 is performed, it is judged whether an allocation condition is satisfied according to the determined BWP difference information and the reliability requirement of the service corresponding to the BWP that needs to be allocated to the first node.

In a specific implementation, after determining the BWP difference information corresponding to different parameter sets of the first node to which a BWP needs to be allocated and the second node to which a BWP has been allocated, it may be judged whether the allocation condition is satisfied according to the determined BWP difference information and the reliability requirement of the service corresponding to the BWP that needs to be allocated to the first node. It can be determined that resource allocation can be performed for the first node in the same time unit as for the second node only when the first node satisfies the allocation condition.

In a specific implementation, an embodiment is: there are two sets of allocation conditions for judgment.

First allocation condition:

1. the difference value between the BWP that needs to be allocated to the first node and the BWP that has been allocated to the second node is less than the maximum difference value;

2. the reliability level of the service corresponding to the BWP that needs to be allocated to the first node is lower than a threshold;

3. there are resources matching with the BWP that needs to be allocated to the first node in the resources that can be allocated in the time unit corresponding to the second node.

Here, the maximum difference value is the maximum difference value corresponding to the coding configuration information of the first node in the BWP difference information.

When the first node satisfies all the foregoing conditions, it is determined that resource allocation can be performed for the first node in the same time unit as for the second node. Further, since the difference value between the BWP that needs to be allocated to the first node and the BWP that has been allocated to the second node is less than the maximum difference value, when the data transmission is performed in the FDM mode, the interference introduced by the BWP can be compensated by the coding gain and so on, and thus the characteristics of low latency and high reliability of the V2X service can be ensured. Further, since the data transmission is performed in the FDM mode, the characteristics of high node density and high business volume of the V2X service can be satisfied.

For example: it is assumed that there are three different parameter sets (namely N1, N2 and N3) and two coding configurations (C1 and C2) in the 5G NR V2X system; the threshold of the reliability level of the service corresponding to the BWP that needs to be allocated to the first node is preset as 5, and it is assumed that the mapping table of the BWP difference in size between different parameter sets is set as shown in Table 1 above.

EXAMPLE 1 it is assumed that the service configuration parameter set of the node A to which a BWP has been allocated is N1, and the service configuration parameter set of the node B to which a BWP needs to be allocated is N2. The resources have been allocated to the node A, and the allocated BWP is BWP(A)=20 MHz in a given time unit. The node B to which a BWP needs to be allocated wants to be allocated with resources in the same time unit as the node A to which a BWP has been allocated in the FDM mode, and the BWP to be allocated is BWP(B)=19 MHz. The coding configuration adopted by the node B to which a BWP needs to be allocated is C2, while the reliability level of the service corresponding to the BWP that needs to be allocated to the node B is 2, and there are adjacent 20 MHz continuous and idle frequency-domain resources that can be used in the time unit corresponding to the node A to which a BWP has been allocated.

Then, when the node B to which a BWP needs to be allocated wants to be allocated with resources in the same time unit as the node A to which a BWP has been allocated in the FDM mode, and the BWP to be allocated is BWP(B)=19 MHz while the adopted coding configuration is C2, it can be seen from Table 1 that the maximum difference value in size of the BWPs is 2 MHz, while the difference value between the BWP of the node A and the BWP of the node B is 1 MHz that is less than the maximum difference value of 2 MHz, so the node B satisfies the first requirement of the first allocation condition;

the reliability level of the service corresponding to the BWP that needs to be allocated to the node B is 2, while the preset threshold of the reliability level of the service corresponding to the BWP that needs to be allocated to the first node is 5, so the reliability level of the service corresponding to the BWP that needs to be allocated to the node B is lower than the threshold, and thus the node B satisfies the second requirement of the first allocation condition;

the node B to which a BWP needs to be allocated wants to be allocated with resources in the same time unit as the node A to which a BWP has been allocated in the FDM mode, the BWP to be allocated is BWP(B)=19 MHz, and there are adjacent 20 MHz continuous and idle frequency-domain resources that can be used in the time unit corresponding to the node A to which a BWP has been allocated, so it is determined that the node B to which a BWP needs to be allocated can use adjacent 19 MHz continuous and idle frequency-domain resources in the same time unit as the node A to which a BWP has been allocated, and thus the node B satisfies the third requirement of the first allocation condition.

In summary, the node B satisfies all the requirements of the first allocation condition, so it is determined that the node B satisfies the first allocation condition, and then step 102 is performed.

In step 102, a BWP is allocated to the first node in the time unit corresponding to the second node if the allocation condition is satisfied.

In a specific implementation, after determining that the allocation condition is satisfied, the BWP is allocated to the first node in the time unit corresponding to the second node. In this way, when it is determined that the difference value between the BWP that needs to be allocated to the first node and the BWP that has been allocated to the second node is less than the maximum difference value and that the reliability level of the service corresponding to the BWP that needs to be allocated to the first node is lower than the threshold, the interference introduced by the BWP can be compensated by the coding gain, etc.; and further, when there are resources matching with the BWP that needs to be allocated to the first node in the resources that can be allocated in the time unit corresponding to the second node, the BWP is allocated to the first node in the time unit corresponding to the second node.

In one embodiment, after judging whether the allocation condition is satisfied according to the determined BWP difference information and the reliability requirement of the service corresponding to the BWP that needs to be allocated to the first node, the BWP is allocated in the FDM mode in a time unit different from the time unit corresponding to the second node in the TDM mode if the allocation condition is not satisfied.

In a specific implementation, if it is determined that the first node does not satisfies the first allocation condition, the BWP is allocated in the FDM mode in the time unit different from the time unit corresponding to the second node in the TDM mode. In this way, it is also possible to allocate the BWP in the FDM mode in the time unit different from the time unit corresponding to the second node in the TDM mode even when the BWP cannot be allocated to the first node in the same time unit as the second node to which a BWP has been allocated.

For example: it is assumed that there are three different parameter sets (N1, N2 and N3) and two coding configurations (C1 and C2) in the 5G NR V2X system; the threshold of the reliability level of the service corresponding to the BWP that needs to be allocated to the first node is preset as 5, and it is assumed that the mapping relationship of the BWP difference in size between different parameter sets is set as shown in Table 1.

EXAMPLE 1 it is assumed that the service configuration parameter set of the node A to which a BWP has been allocated is N1, and the service configuration parameter set of the node B to which a BWP needs to be allocated is N2. The resources have been allocated to the node A, and the allocated BWP is BWP(A)=20 MHz in a given time unit. The node B wants to be allocated with resources in the same time unit as the node A to which a BWP has been allocated in the FDM mode, and the BWP to be allocated is BWP(B)=19 MHz. The coding configuration adopted by the node B to which a BWP needs to be allocated is C2, while the reliability level of the service corresponding to the BWP that needs to be allocated to the node B is 2, and there are adjacent 18 MHz continuous and idle frequency-domain resources that can be used in the time unit corresponding to the node A to which a BWP has been allocated.

Then, when the node B to which a BWP needs to be allocated wants to be allocated with resources in the same time unit as the node A to which a BWP has been allocated in the FDM mode, and the BWP to be allocated is BWP(B)=19 MHz while the adopted coding configuration is C2, it can be seen from Table 1 that the maximum difference value in size of the BWPs is 2 MHz, while the difference value between the BWP of the node A to which a BWP has been allocated and the BWP of the node B to which a BWP needs to be allocated is 1 MHz that is less than the maximum difference value of 2 MHz, so the node B satisfies the first requirement of the first allocation condition;

the reliability level of the service corresponding to the BWP that needs to be allocated to the node B is 2, while the preset threshold of the reliability level of the service corresponding to the BWP that needs to be allocated to the first node is 5, so the reliability level of the service corresponding to the BWP that needs to be allocated to the node B is lower than the threshold, and thus the node B satisfies the second requirement of the first allocation condition;

the node B to which a BWP needs to be allocated wants to be allocated with resources in the same time unit as the node A to which a BWP has been allocated in the FDM mode, the BWP to be allocated is BWP(B)=19 MHz, and there are adjacent 18 MHz continuous and idle frequency-domain resources that can be used in the time unit corresponding to the node A to which a BWP has been allocated, so it is determined that the node B to which a BWP needs to be allocated cannot use adjacent 19 MHz continuous and idle frequency-domain resources in the same time unit as the node A to which a BWP has been allocated, and thus the node B does not satisfy the third requirement of the first allocation condition.

In summary, the node B does not satisfy all the requirements of the first allocation condition, so it is determined that the node B to which a BWP needs to be allocated does not satisfy the first allocation condition, and then the BWP is allocated in the FDM mode in the time unit different from the time unit corresponding to the second node in the TDM mode.

Second Allocation Condition:

1. the difference value between the BWP that needs to be allocated to the first node and the BWP that has been allocated to the second node is not less than the maximum difference value;

2. the reliability level of the service corresponding to the BWP that needs to be allocated to the first node is not lower than the threshold;

3. there are resources matching with: the BWP that needs to be allocated to the first node and resources corresponding to the guard interval information, in the resources that can be allocated in the time unit corresponding to the second node;

the resources corresponding to the guard interval information are resources corresponding to the coding configuration information of the first node in guard interval information corresponding to different parameters sets of the first node and the second node.

When the first node to which a BWP needs to be allocated satisfies all the foregoing conditions, it is determined that the first node can be allocated with resources in the same time unit as the second node to which the BWP has been allocated. Further, since the difference value between the BWP that needs to be allocated to the first node and the BWP that has been allocated to the second node is not less than the maximum difference value, and the reliability level of the service corresponding to the BWP that needs to be allocated to the first node is also relatively high, the guard interval is used to avoid the interference caused by the tailing signal at this time.

In a specific implementation, when judging whether the second allocation condition is satisfied, it is also necessary to determine whether there are resources matching with: the BWP that needs to be allocated to the first node and the resources corresponding to the guard interval information, in the resources that can be allocated in the time unit corresponding to the second node.

In one embodiment, the guard interval information corresponding to different parameters sets of the first node and the second node is determined according to a second mapping relationship between different parameter sets and guard interval information.

In a specific implementation, the guard interval information corresponding to different parameters sets of the first node and the second node is determined according to the parameter set of the first node, the parameter set of the second node, and the second mapping relationship between different parameter sets and guard interval information. In this way, according to the determined guard interval information, it can be further judged whether there are resources matching with the BWP that needs to be allocated to the first node in the resources that can be allocated in the time unit corresponding to the second node that has been allocated, and the data transmission mode is further determined.

Here, the second mapping relationship between different parameter sets and guard interval information refers to a mapping relationship of frequency-domain guard intervals among different parameter sets set in a given time unit, and represents the bandwidth size of the frequency-domain guard interval set between the first node and the second node under different encoding configurations among different parameter sets.

For example, referring to Table 2, there are three different parameter sets (namely N1, N2 and N3) in the V2X system, where the first row of Table 2 represents: between the parameter set N1 and the parameter set N2, if the adopted coding configuration is C1, then the bandwidth of the frequency-domain guard interval corresponding to the two nodes is 30 MHz; and if the adopted coding configuration is C2, then the bandwidth of the frequency-domain guard interval corresponding to the two nodes is 60 MHz.

The second row represents: between the parameter set N1 and the parameter set N3, if the adopted coding configuration is C1, then the bandwidth of the frequency-domain guard interval corresponding to the two nodes is 120 MHz; and if the adopted coding configuration is C2, then the bandwidth of the frequency-domain guard interval corresponding to the two nodes is 240 MHz.

The third row represents: between the parameter set N2 and the parameter set N3, if the adopted coding configuration is C1, then the bandwidth of the frequency-domain guard interval corresponding to the two nodes is 240 MHz; and if the adopted coding configuration is C2, then the bandwidth of the frequency-domain guard interval corresponding to the two nodes is 480 MHz.

Thus, in a specific implementation of the embodiments of the present application, after the parameter set of the first node to which a BWP needs to be allocated and the parameter set of the second node to which a BWP has been allocated are determined, and it is determined that the BWP difference value between the parameter set of the first node to which a BWP needs to be allocated and the parameter set of the second node to which a BWP has been allocated is not less than the maximum difference value, the guard interval information corresponding to different parameter sets of the first node and the second node can be determined according to the second mapping relationship between different parameter sets and guard interval information.

For example: it is assumed that there are three different parameter sets (N1, N2 and N3) and two coding configurations (C1 and C2) in the 5G NR V2X system; the threshold of the reliability level of the service corresponding to the BWP that needs to be allocated to the first node is preset as 5, and it is assumed that the mapping table of frequency-domain guard interval between different parameter sets is set as follows:

TABLE 2 mapping table of frequency-domain guard interval between different parameter sets

| N1 – N2 | C1 | 30 kHz |
|---|---|---|
|  | C2 | 60 kHz |
| N1 – N3 | C1 | 120 kHz |
|  | C2 | 240 kHz |
| N2 – N3 | C1 | 240 MHz |
|  | C2 | 480 MHz |

First Example: referring to Table 2, it is assumed that the service configuration parameter set of the node A to which a BWP has been allocated is N1, and the service configuration parameter set of the node B to which a BWP needs to be allocated is N2. The resources have been allocated to the node A, and the allocated BWP is BWP(A)=20 MHz in a given time unit.

Then it can be determined that the guard interval information corresponding to the node A to which a BWP has been allocated and the node B to which a BWP needs to be allocated is the guard interval information between the parameter set N1 and the parameter set N2, and thus the guard interval information corresponding to the node A to which a BWP has been allocated and the node B to which a BWP needs to be allocated is determined as:

if the coding configuration adopted by the node B to which a BWP needs to be allocated is C1, the bandwidth of the frequency-domain guard interval corresponding to the node A to which a BWP has been allocated and the node B to which a BWP needs to be allocated is 30 MHz;

if the coding configuration adopted by the node B to which a BWP needs to be allocated is C2, the bandwidth of the frequency-domain guard interval corresponding to the node A to which a BWP has been allocated and the node B to which a BWP needs to be allocated is 60 MHz.

EXAMPLE 2 referring to Table 2, it is assumed that the service configuration parameter set of the node A to which a BWP has been allocated is N2, and the service configuration parameter set of the node B to which a BWP needs to be allocated is N3. The resources have been allocated to the node A, and the allocated BWP is BWP(A)=20 MHz in a given time unit.

Then it can be determined that the guard interval information corresponding to the node A to which a BWP has been allocated and the node B to which a BWP needs to be allocated is the guard interval information between the parameter set N2 and the parameter set N3, and thus the guard interval information corresponding to the node A to which a BWP has been allocated and the node B to which a BWP needs to be allocated is determined as:

if the coding configuration adopted by the node B to which a BWP needs to be allocated is C1, the bandwidth of the frequency-domain guard interval corresponding to the node A to which a BWP has been allocated and the node B to which a BWP needs to be allocated is 240 MHz;

if the coding configuration adopted by the node B to which a BWP needs to be allocated is C2, the bandwidth of the frequency-domain guard interval corresponding to the node A to which a BWP has been allocated and the node B to which a BWP needs to be allocated is 480 MHz.

After the guard interval information corresponding to different parameters sets of the first node and the second node can be determined according to the second mapping relationship between different parameter sets and guard interval information, the judgment performed on the first node according to the second allocation condition will be illustrated below by way of examples.

For example: it is assumed that there are three different parameter sets (N1, N2 and N3) and two coding configurations (C1 and C2) in the 5G NR V2X system; the threshold of the reliability level of the service corresponding to the BWP that needs to be allocated to the first node is preset as 5, and it is assumed that the mapping relationship of the BWP difference in size between different parameter sets is set as shown in Table 1, and the mapping relationship of the frequency-domain guard interval between different parameter sets is as shown in Table 2.

EXAMPLE 1 it is assumed that the service configuration parameter set of the node A to which a BWP has been allocated is N1, and the service configuration parameter set of the node B to which a BWP needs to be allocated is N2. The resources have been allocated to the node A, and the allocated BWP is BWP(A)=20 MHz in a given time unit. The node B to which a BWP needs to be allocated wants to be allocated with resources in the same time unit as the node A to which a BWP has been allocated in the FDM mode, and the BWP to be allocated is BWP(B)=10 MHz. The coding configuration adopted by the node B to which a BWP needs to be allocated is C2, while the reliability level of the service corresponding to the BWP that needs to be allocated to the node B is 7, and there are adjacent 80 MHz continuous and idle frequency-domain resources that can be used in the time unit corresponding to the node A to which a BWP has been allocated.

Then, when the node B to which a BWP needs to be allocated wants to be allocated with resources in the same time unit as the node A to which a BWP has been allocated in the FDM mode, and the BWP to be allocated is BWP(B)=10 MHz while the adopted coding configuration is C2, it can be seen from Table 1 that the maximum difference value in size of the BWPs is 2 MHz, while the difference value between the BWP of the node A to which a BWP has been allocated and the BWP of the node B to which a BWP needs to be allocated is 10 MHz that is obviously greater than the maximum difference value of 2 MHz, so the node B to which a BWP needs to be allocated satisfies the first requirement of the second allocation condition;

the reliability level of the service corresponding to the BWP that needs to be allocated to the node B is 7, while the preset threshold of the reliability level of the service corresponding to the BWP that needs to be allocated to the first node is 5, so the reliability level of the service corresponding to the BWP that needs to be allocated to the node B is higher than the threshold, and thus the node B to which a BWP needs to be allocated satisfies the second requirement of the second allocation condition;

the service configuration parameter set of the node A to which a BWP has been allocated is N1, the service configuration parameter set of the node B to which a BWP needs to be allocated is N2, and the coding configuration adopted by the node B to which a BWP needs to be allocated is C2, so the bandwidth of the frequency-domain guard interval corresponding to the node A to which a BWP has been allocated and the node B to which a BWP needs to be allocated is determined as 60 MHz; and the node B to which a BWP needs to be allocated wants to be allocated with resources in the same time unit as the node A to which a BWP has been allocated in the FDM mode, and the BWP to be allocated is BWP(B)=10 MHz, while there are adjacent 80 MHz continuous and idle frequency-domain resources that can be used in the time unit corresponding to the node A to which a BWP has been allocated, so there are resources matching with: the BWP that needs to be allocated to the first node and the resources corresponding to the guard interval information, in the resources that can be allocated in the time unit corresponding to the second node, and thus the node B to which a BWP needs to be allocated satisfies the third requirement of the second allocation condition.

In summary, the node B to which a BWP needs to be allocated satisfies all the requirements of the second allocation condition, so it is determined that the node B to which a BWP needs to be allocated satisfies the second allocation condition, and then step 102 is performed.

In step 102, a BWP is allocated to the first node in the time unit corresponding to the second node if the allocation condition is satisfied.

In a specific implementation, after determining that the allocation condition is satisfied, the BWP is allocated to the first node in the time unit corresponding to the second node. In this way, when it is determined that the difference value between the BWP that needs to be allocated to the first node and the BWP that has been allocated to the second node is greater than the maximum difference value and that the reliability level of the service corresponding to the BWP that needs to be allocated to the first node is not less than the threshold, the interference of the tailing signals can be eliminated by setting the guard interval; and further, when there are resources matching with the BWP that needs to be allocated to the first node and the resources corresponding to the guard interval information, in the resources that can be allocated in the time unit corresponding to the second node, the BWP is allocated to the first node in the time unit corresponding to the second node.

In one embodiment, if the second allocation condition is satisfied, a BWP is allocated to the first node in the time unit corresponding to the second node, and a frequency-domain guard interval is set between the BWP of the first node and the BWP of the second node according to the resources corresponding to the guard interval information.

In a specific implementation, when it is determined that the first node satisfies the second allocation condition, the BWP is allocated to the first node in the time unit corresponding to the second node, and the frequency-domain guard interval is set between the BWP of the first node and the BWP of the second node according to the resources corresponding to the guard interval information. Since the guard interval is set between the BWP of the first node and the BWP of the second node, the interference of the tailing signal can be eliminated, so that the service requirement of high reliability during the V2X service transmission can be ensured. Further, the data transmission is performed in the FDM mode, so the service requirement of low latency during the V2X service transmission can be ensured, improving the performance.

For example, referring to Table 2, it is assumed that the service configuration parameter set of the node A to which a BWP has been allocated is N2, and the service configuration parameter set of the node B to which a BWP needs to be allocated is N3. The resources have been allocated to the node A, and the allocated BWP is BWP(A)=20 MHz in a given time unit. It has been determined that the node B to which a BWP needs to be allocated satisfies the second allocation condition, and the adopted coding configuration is C1.

Then the guard interval information corresponding to the node A to which a BWP has been allocated and the node B to which a BWP needs to be allocated can be determined as follows: the bandwidth of the frequency-domain guard interval corresponding to the node A to which a BWP has been allocated and the node B to which a BWP needs to be allocated is further determined as 240 MHz according to the coding configuration of C1 adopted by the node B to which a BWP needs to be allocated.

After the bandwidth of the frequency-domain guard interval corresponding to the node A to which a BWP has been allocated and the node B to which a BWP needs to be allocated is determined as 240 MHz, a BWP is allocated to the first node in the time unit corresponding to the second node, and the frequency-domain guard interval is set between the BWP of the first node and the BWP of the second node, where the bandwidth of the frequency-domain guard interval is 240 MHz.

In one embodiment, after judging whether the allocation condition is satisfied according to the determined BWP difference information and the reliability requirement of the service corresponding to the BWP that needs to be allocated to the first node, the BWP is allocated in the FDM mode in a time unit different from the time unit corresponding to the second node in the TDM mode if the allocation condition is not satisfied.

In a specific implementation, if it is determined that the first node does not satisfies the allocation condition, the BWP is allocated in the FDM mode in the time unit different from the time unit corresponding to the second node in the TDM mode. In this way, when the resources cannot be allocated to the first node in the current time unit of the second node, it is also possible to allocate the BWP in the FDM mode in the time unit different from the time unit corresponding to the second node in the TDM mode.

For example: it is assumed that there are three different parameter sets (N1, N2 and N3) and two coding configurations (C1 and C2) in the 5G NR V2X system; the threshold of the reliability level of the service corresponding to the BWP that needs to be allocated to the first node is preset as 5, and it is assumed that the mapping relationship of the BWP difference in size between different parameter sets is set as shown in Table 1, and the mapping relationship of the frequency-domain guard interval between different parameter sets is as shown in Table 2.

EXAMPLE 1 it is assumed that the service configuration parameter set of the node A to which a BWP has been allocated is N1, and the service configuration parameter set of the node B to which a BWP needs to be allocated is N2. The resources have been allocated to the node A, and the allocated BWP is BWP(A)=20 MHz in a given time unit. The node B to which a BWP needs to be allocated wants to be allocated with resources in the same time unit as the node A to which a BWP has been allocated in the FDM mode, and the BWP that needs to be allocated is BWP(B)=10 MHz. The adopted coding configuration is C2, while the reliability level of the service corresponding to the BWP that needs to be allocated to the node B is 7, and there are adjacent 50 MHz continuous and idle frequency-domain resources that can be used in the time unit corresponding to the node A to which a BWP has been allocated.

Then, when the node B to which a BWP needs to be allocated wants to be allocated with resources in the same time unit as the node A to which a BWP has been allocated in the FDM mode, and the BWP to be allocated is BWP(B)=10 MHz while the adopted coding configuration is C2, it can be seen from Table 1 that the maximum difference value in size of the BWPs is 2 MHz, while the difference value between the BWP of the node A to which a BWP has been allocated and the BWP of the node B to which a BWP needs to be allocated is 10 MHz that is obviously greater than the maximum difference value of 2 MHz, so the node B to which a BWP needs to be allocated satisfies the first requirement of the second allocation condition;

the reliability level of the service corresponding to the BWP that needs to be allocated to the node B is 7, while the preset threshold of the reliability level of the service corresponding to the BWP that needs to be allocated to the first node is 5, so the reliability level of the service corresponding to the BWP that needs to be allocated to the node B is higher than the threshold, and thus the node B to which a BWP needs to be allocated satisfies the second requirement of the second allocation condition;

the service configuration parameter set of the node A to which a BWP has been allocated is N1, the service configuration parameter set of the node B to which a BWP needs to be allocated is N2, and the adopted coding configuration is C2, so the frequency-domain guard interval corresponding to the node A to which a BWP has been allocated and the node B to which a BWP needs to be allocated is determined as 60 MHz; and the node B to which a BWP needs to be allocated wants to be allocated in the same time unit as the node A to which a BWP has been allocated in the FDM mode, and the BWP to be allocated is BWP(B)=10 MHz, while there are adjacent 50 MHz continuous and idle frequency-domain resources that can be used in the time unit corresponding to the node A to which a BWP has been allocated, so there is no resource matching with the BWP that needs to be allocated to the first node and the resources corresponding to the guard interval information, in the resources that can be allocated in the time unit corresponding to the second node, and thus the node B to which a BWP needs to be allocated does not satisfy the third requirement of the second allocation condition.

In summary, the node B to which a BWP needs to be allocated does not satisfy all the requirements of the second allocation condition, so it is determined that the node B to which a BWP needs to be allocated does not satisfy the second allocation condition, and then the BWP is allocated in the FDM mode in the time unit different from the time unit corresponding to the second node in the TDM mode.

Figure 2:
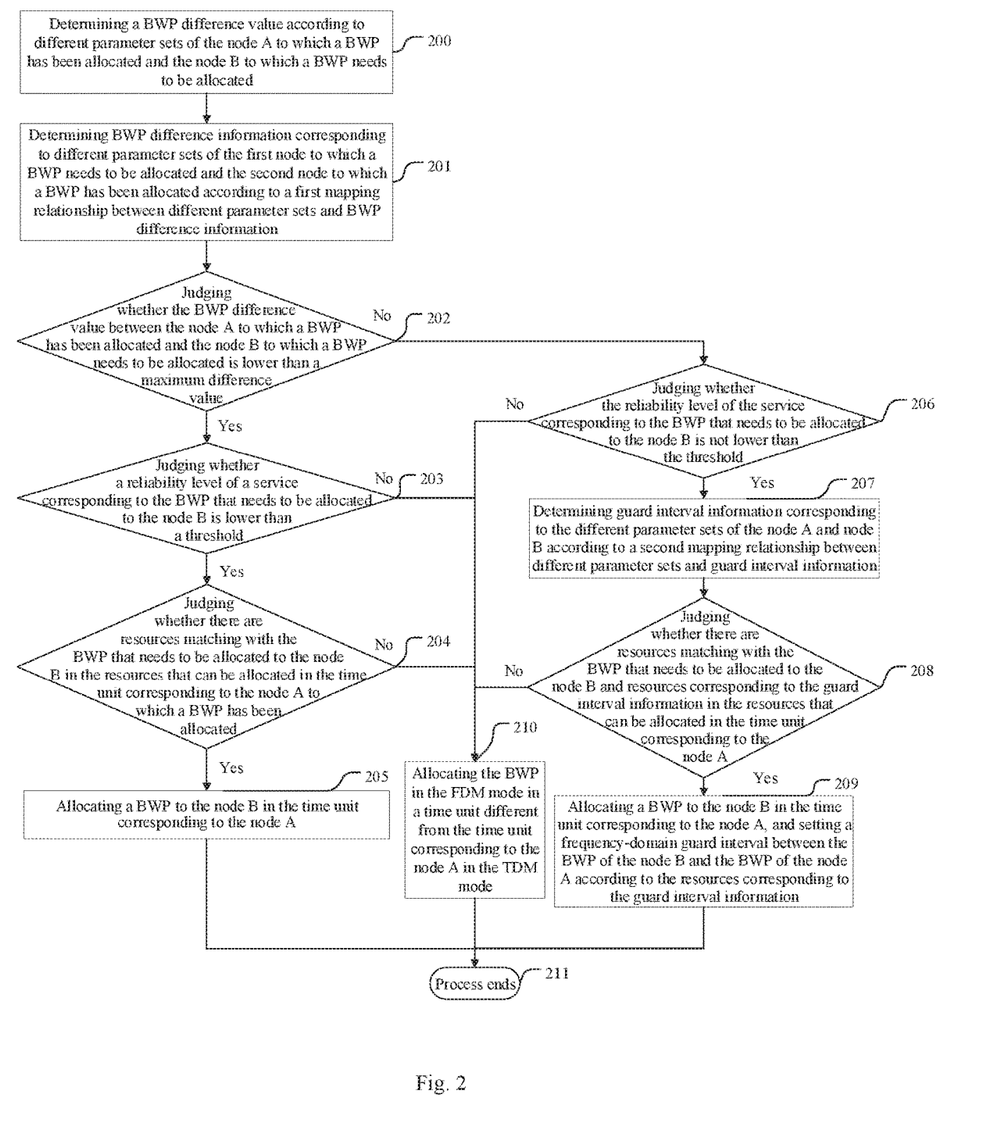
FIG. 2 is a schematic diagram of a detailed flow of a method for BWP allocation provided by an embodiment of the present application.

As shown in FIG. 2, it is a schematic diagram of a detailed flow of a method for BWP allocation of embodiments of the present application, where the first node is the node B and the second node is the node A as an example.

Step 200: determining the corresponding BWP difference value according to different parameter sets of the node A to which a BWP has been allocated and the node B to which a BWP needs to be allocated.

Step 201: determining the BWP difference information corresponding to different parameter sets of the node B and node A according to the first mapping relationship between different parameter sets and BWP difference information.

Step 202: judging whether the BWP difference value between the node A and node B is greater than the maximum difference value; if so, performing step 203; otherwise, performing step 206.

Step 203: judging whether the reliability level of the service corresponding to the BWP that needs to be allocated to the node B is lower than a threshold; if so, performing step 204; otherwise, performing step 210.

Step 204: judging whether there are resources matching with the BWP that needs to be allocated to the node B in the resources that can be allocated in the time unit corresponding to the node A; if so, performing step 205; otherwise, performing step 210.

Step 205: allocating a BWP to the node B in the time unit corresponding to the node A.

Step 206: judging whether the reliability level of the service corresponding to the BWP that needs to be allocated to the node B is not lower than the threshold; if so, performing step 207; otherwise, performing step 210.

Step 207: determining the guard interval information corresponding to different parameter sets of the node A and node B according to the second mapping relationship between different parameter sets and guard interval information.

Step 208: judging whether there are resources matching with the BWP that needs to be allocated to the node B and the resources corresponding to the guard interval information, in the resources that can be allocated in the time unit corresponding to the node A; if so, performing step 209; otherwise, performing step 210.

Step 209: allocating a BWP to the node B in the time unit corresponding to the node A, and setting a frequency-domain guard interval between the BWP of the node B and the BWP of the node A according to the resources corresponding to the guard interval information.

Step 210: allocating the BWP in the FDM mode in a time unit different from the time unit corresponding to the node A in the TDM mode.

Step 211: this process ends.

Based on the same inventive concept, embodiments of the present application further provide a device for BWP allocation. Since this device corresponds to the device in the method for BWP allocation in the embodiments of the present application and the principle solving the problem of this device is similar to that of the method, the implementations of this device can refer to the implementations of the method, and the repeated description thereof will be omitted here.

Figure 3:
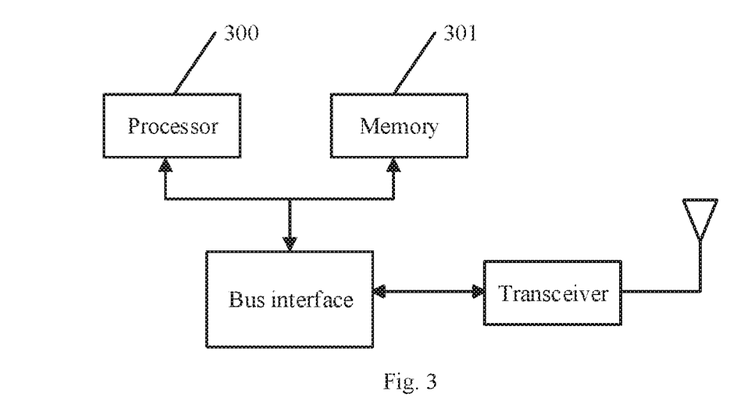
FIG. 3 is a schematic diagram of a structural of a first device for BWP allocation provided by an embodiment of the present application.

As shown in FIG. 3, a first device for BWP allocation in embodiments of the present application includes a processor 300, a memory 301 and a transceiver 302.

The processor 300 is responsible for managing the bus architecture and general processing, and the memory 301 may store the data used by the processor 300 when performing the operations. The transceiver 302 is configured to receive and send the data under the control of the processor 300.

The bus architecture may include any numbers of interconnected buses and bridges, and specifically link various circuits of one or more processors represented by the processor 300 and the memory represented by the memory 301. The bus architecture may further link various other circuits such as peripheral device, voltage regulator and power management circuit, which are all well known in the art and thus will not be further described again herein. The bus interface provides an interface. The processor 300 is responsible for managing the bus architecture and general processing, and the memory 301 may store the data used by the processor 300 when performing the operations.

The procedure disclosed by the embodiments of the present application may be applied in the processor 300 or implemented by the processor 300. In the implementation process, each step of the signal processing flow may be completed by the integrated logic circuit of hardware or the instruction in the form of software in the processor 300. The processor 300 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 301, and the processor 300 reads the information in the memory 301 and completes the steps of the signal processing flow in combination with its hardware.

In one embodiment, the processor 300 is configured to read the program in the memory 301 and to:

determine BWP difference information corresponding to different parameter sets of a first node to which a BWP needs to be allocated and a second node to which a BWP has been allocated according to a first mapping relationship between different parameter sets and BWP difference information, and BWP allocation needs to be performed for the first node in a time unit corresponding to the second node;

judge whether an allocation condition is satisfied according to the determined BWP difference information and a reliability requirement of a service corresponding to the BWP that needs to be allocated to the first node; and allocate a BWP to the first node in the time unit corresponding to the second node if the allocation condition is satisfied.

In one embodiment, the allocation condition includes some or all of the following allocation conditions:

a first allocation condition: the difference value between the BWP that needs to be allocated to the first node and the BWP that has been allocated to the second node is less than the maximum difference value, the reliability level of the service corresponding to the BWP that needs to be allocated to the first node is lower than a threshold, and there are resources matching with the BWP that needs to be allocated to the first node in resources that can be allocated in the time unit corresponding to the second node;

a second allocation condition: the difference value between the BWP that needs to be allocated to the first node and the BWP that has been allocated to the second node is not less than the maximum difference value, the reliability level of the service corresponding to the BWP that needs to be allocated to the first node is not lower than the threshold, and there are resources matching with the BWP that needs to be allocated to the first node and resources corresponding to guard interval information, in resources that can be allocated in the time unit corresponding to the second node;

and the maximum difference value is a maximum difference value corresponding to coding configuration information of the first node in the BWP difference information; and the resources corresponding to the guard interval information are resources corresponding to the coding configuration information of the first node in guard interval information corresponding to different parameters sets of the first node and the second node.

In one embodiment, the processor 300 is further configured to:

determine the guard interval information corresponding to different parameters sets of the first node and the second node according to a second mapping relationship between different parameter sets and guard interval information.

In one embodiment, the processor 300 is further configured to:

if the second allocation condition is satisfied, allocate a BWP to the first node in the time unit corresponding to the second node, and set a frequency-domain guard interval between the BWP of the first node and the BWP of the second node according to the resources corresponding to the guard interval information.

In one embodiment, the processor 300 is further configured to:

allocate a BWP in the FDM mode in a time unit different from the time unit corresponding to the second node in the TDM mode if the allocation condition is not satisfied after judging whether the allocation condition is satisfied according to the determined BWP difference information and the reliability requirement of the service corresponding to the BWP that needs to be allocated to the first node.

Figure 4:
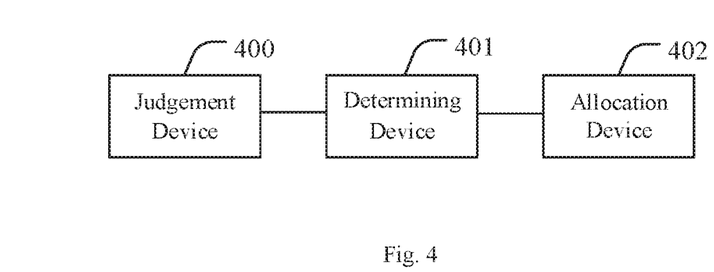
FIG. 4 is a schematic diagram of a structural of a second device for BWP allocation provided by an embodiment of the present application.

As shown in FIG. 4, embodiments of the present application provides a device for BWP allocation, which includes:

a determining device 400 configured to determine BWP difference information corresponding to different parameter sets of a first node to which a BWP needs to be allocated and a second node to which a BWP has been allocated according to a first mapping relationship between different parameter sets and BWP difference information, and BWP allocation needs to be performed for the first node in a time unit corresponding to the second node;

a judgment device 401 configured to judge whether an allocation condition is satisfied according to the determined BWP difference information and a reliability requirement of a service corresponding to the BWP that needs to be allocated to the first node; and an allocation device 402 configured to allocate a BWP to the first node in the time unit corresponding to the second node if the allocation condition is satisfied.

In one embodiment, the allocation condition includes some or all of the following allocation conditions:

a first allocation condition: the difference value between the BWP that needs to be allocated to the first node and the BWP that has been allocated to the second node is less than the maximum difference value, the reliability level of the service corresponding to the BWP that needs to be allocated to the first node is lower than a threshold, and there are resources matching with the BWP that needs to be allocated to the first node in resources that can be allocated in the time unit corresponding to the second node;

a second allocation condition: the difference value between the BWP that needs to be allocated to the first node and the BWP that has been allocated to the second node is not less than the maximum difference value, the reliability level of the service corresponding to the BWP that needs to be allocated to the first node is not lower than the threshold, and there are resources matching with the BWP that needs to be allocated to the first node and resources corresponding to guard interval information, in resources that can be allocated in the time unit corresponding to the second node;

and the maximum difference value is a maximum difference value corresponding to coding configuration information of the first node in the BWP difference information; and the resources corresponding to the guard interval information are resources corresponding to the coding configuration information of the first node in guard interval information corresponding to different parameters sets of the first node and the second node.

In one embodiment, the determining device 400 is further configured to:

determine the guard interval information corresponding to different parameters sets of the first node and the second node according to a second mapping relationship between different parameter sets and guard interval information.

In one embodiment, the allocation device 402 is further configured to:

if the second allocation condition is satisfied, allocate a BWP to the first node in the time unit corresponding to the second node, and set a frequency-domain guard interval between the BWP of the first node and the BWP of the second node according to the resources corresponding to the guard interval information.

In one embodiment, the allocation device 402 is further configured to:

allocate a BWP in the FDM mode in a time unit different from the time unit corresponding to the second node in the TDM mode if the allocation condition is not satisfied after judging whether the allocation condition is satisfied according to the determined BWP difference information and the reliability requirement of the service corresponding to the BWP that needs to be allocated to the first node.

A computer storage medium stores a computer program thereon, the program implement the steps of the above method described in FIG. 1 or FIG. 2 when executed by a processor.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A method for Bandwidth Part, BWP, allocation, comprising:

determining BWP difference information corresponding to different parameter sets of a first node to which a BWP needs to be allocated and a second node to which a BWP has been allocated according to a first mapping relationship between different parameter sets and BWP difference information, wherein the BWP allocation needs to be performed for the first node in a time unit corresponding to the second node;

judging whether an allocation condition is satisfied according to the determined BWP difference information and a reliability requirement of a service corresponding to the BWP that needs to be allocated to the first node; and allocating a BWP to the first node in the time unit corresponding to the second node when the allocation condition is satisfied, wherein the allocation condition comprises some or all of following allocation conditions:

a first allocation condition: a difference value between the BWP that needs to be allocated to the first node and the BWP that has been allocated to the second node is less than a maximum difference value, a reliability level of the service corresponding to the BWP that needs to be allocated to the first node is lower than a threshold, and there are resources matching with the BWP that needs to be allocated to the first node in resources that can be allocated in the time unit corresponding to the second node;

a second allocation condition: the difference value between the BWP that needs to be allocated to the first node and the BWP that has been allocated to the second node is not less than the maximum difference value, the reliability level of the service corresponding to the BWP that needs to be allocated to the first node is not lower than the threshold, and there are resources matching with the BWP that needs to be allocated to the first node and resources corresponding to guard interval information, in resources that can be allocated in the time unit corresponding to the second node;

wherein the maximum difference value is a maximum difference value corresponding to coding configuration information of the first node in the BWP difference information; and the resources corresponding to the guard interval information are resources corresponding to the coding configuration information of the first node in guard interval information corresponding to the different parameters sets of the first node and the second node.

2. The method of claim 1, wherein the guard interval information corresponding to the different parameters sets of the first node and the second node is determined by:

determining the guard interval information corresponding to the different parameters sets of the first node and the second node according to a second mapping relationship between different parameter sets and guard interval information.

3. The method of claim 2, wherein after judging whether the allocation condition is satisfied according to the determined BWP difference information and the reliability requirement of the service corresponding to the BWP that needs to be allocated to the first node, the method further comprises:
when the allocation condition is not satisfied, allocating a BWP in a Frequency Division Multiplex, FDM, mode in a time unit different from the time unit corresponding to the second node in a Time Division Multiplex, TDM, mode.

4. The method of claim 1, wherein the allocating a BWP to the first node in the time unit corresponding to the second node comprises:
when the second allocation condition is satisfied, allocating a BWP to the first node in the time unit corresponding to the second node, and setting a frequency-domain guard interval between the BWP of the first node and the BWP of the second node according to the resources corresponding to the guard interval information.

5. The method of claim 4, wherein after judging whether the allocation condition is satisfied according to the determined BWP difference information and the reliability requirement of the service corresponding to the BWP that needs to be allocated to the first node, the method further comprises:
when the allocation condition is not satisfied, allocating a BWP in a Frequency Division Multiplex, FDM, mode in a time unit different from the time unit corresponding to the second node in a Time Division Multiplex, TDM, mode.

6. The method of claim 1, wherein after judging whether the allocation condition is satisfied according to the determined BWP difference information and the reliability requirement of the service corresponding to the BWP that needs to be allocated to the first node, the method further comprises:
when the allocation condition is not satisfied, allocating a BWP in a Frequency Division Multiplex, FDM, mode in a time unit different from the time unit corresponding to the second node in a Time Division Multiplex, TDM, mode.

7. The method of claim 1, wherein after judging whether the allocation condition is satisfied according to the determined BWP difference information and the reliability requirement of the service corresponding to the BWP that needs to be allocated to the first node, the method further comprises:
when the allocation condition is not satisfied, allocating a BWP in a Frequency Division Multiplex, FDM, mode in a time unit different from the time unit corresponding to the second node in a Time Division Multiplex, TDM, mode.

8. A device for BWP allocation, comprising:
a processor, a memory and a transceiver;
wherein the processor is configured to read a program in the memory and perform:
determining BWP difference information corresponding to different parameter sets of a first node to which a BWP needs to be allocated and a second node to which a BWP has been allocated according to a first mapping relationship between different parameter sets and BWP difference information, wherein the BWP allocation needs to be performed for the first node in a time unit corresponding to the second node;
judging whether an allocation condition is satisfied according to the determined BWP difference information and a reliability requirement of a service corresponding to the BWP that needs to be allocated to the first node; and
allocating a BWP to the first node in the time unit corresponding to the second node when the allocation condition is satisfied, wherein the allocation condition comprises some or all of following allocation conditions:
a first allocation condition: a difference value between the BWP that needs to be allocated to the first node and the BWP that has been allocated to the second node is less than a maximum difference value, a reliability level of the service corresponding to the BWP that needs to be allocated to the first node is lower than a threshold, and there are resources matching with the BWP that needs to be allocated to the first node in resources that can be allocated in the time unit corresponding to the second node;
a second allocation condition: the difference value between the BWP that needs to be allocated to the first node and the BWP that has been allocated to the second node is not less than the maximum difference value, the reliability level of the service corresponding to the BWP that needs to be allocated to the first node is not lower than the threshold, and there are resources matching with the BWP that needs to be allocated to the first node and resources corresponding to guard interval information in resources that can be allocated in the time unit corresponding to the second node;
wherein the maximum difference value is a maximum difference value corresponding to coding configuration information of the first node in the BWP difference information; and the resources corresponding to the guard interval information are resources corresponding to the coding configuration information of the first node in guard interval information corresponding to the different parameters sets of the first node and the second node.

9. The device of claim 8, wherein the processor is further configured to perform:
determining the guard interval information corresponding to the different parameters sets of the first node and the second node according to a second mapping relationship between different parameter sets and guard interval information.

10. The device of claim 9, wherein the processor is further configured to perform:
allocating a BWP in an FDM mode in a time unit different from the time unit corresponding to the second node in a TDM mode when the allocation condition is not satisfied after judging whether the allocation condition is satisfied according to the determined BWP difference information and the reliability requirement of the service corresponding to the BWP that needs to be allocated to the first node.

11. The device of claim 8, wherein the processor is further configured to perform:
when the second allocation condition is satisfied, allocating a BWP to the first node in the time unit corresponding to the second node, and setting a frequency-domain guard interval between the BWP of the first node and the BWP of the second node according to the resources corresponding to the guard interval information.

12. The device of claim 11, wherein the processor is further configured to perform:

allocating a BWP in an FDM mode in a time unit different from the time unit corresponding to the second node in a TDM mode when the allocation condition is not satisfied after judging whether the allocation condition is satisfied according to the determined BWP difference information and the reliability requirement of the service corresponding to the BWP that needs to be allocated to the first node.

13. The device of claim 8, wherein the processor is further configured to perform:

allocating a BWP in an FDM mode in a time unit different from the time unit corresponding to the second node in a TDM mode when the allocation condition is not satisfied after judging whether the allocation condition is satisfied according to the determined BWP difference information and the reliability requirement of the service corresponding to the BWP that needs to be allocated to the first node.

14. The device of claim 8, wherein the processor is further configured to perform:

allocating a BWP in an FDM mode in a time unit different from the time unit corresponding to the second node in a TDM mode when the allocation condition is not satisfied after judging whether the allocation condition is satisfied according to the determined BWP difference information and the reliability requirement of the service corresponding to the BWP that needs to be allocated to the first node.

15. A non-transitory computer storage medium storing a computer program thereon, wherein the program implements the method of claim 1 when executed by a processor.

* * * * *